United States Patent
Linfield et al.

(10) Patent No.: US 7,122,813 B2
(45) Date of Patent: Oct. 17, 2006

(54) DEVICE FOR GENERATING THZ RADIATION

(75) Inventors: Edmund Harold Linfield, Cambridge (GB); Michael Johnston, Cambridge (GB); David Mark Whittaker, Cambridge (GB)

(73) Assignee: Cambridge University Technical Services Limited, (GB)

( * ) Notice: Subject to any disclaimer, the term of this patent is extended or adjusted under 35 U.S.C. 154(b) by 194 days.

(21) Appl. No.: 10/485,252

(22) PCT Filed: Aug. 9, 2002

(86) PCT No.: PCT/GB02/03674

§ 371 (c)(1),
(2), (4) Date: Jul. 13, 2004

(87) PCT Pub. No.: WO03/014823

PCT Pub. Date: Feb. 20, 2003

(65) Prior Publication Data

US 2004/0238760 A1 Dec. 2, 2004

(30) Foreign Application Priority Data

Aug. 10, 2001 (GB) .................................. 0119564.3

(51) Int. Cl.
*H01L 29/06* (2006.01)
(52) U.S. Cl. ...................... 250/504 R; 257/18; 257/22; 257/15; 372/44; 372/43
(58) Field of Classification Search ............ 250/504 R, 250/493.1, 492.24; 257/15, 18, 22
See application file for complete search history.

(56) References Cited

U.S. PATENT DOCUMENTS

| 5,023,879 | A | * | 6/1991 | Wang et al. ............. 372/43.01 |
| 5,729,017 | A | * | 3/1998 | Brener et al. ............. 250/493.1 |
| 5,793,054 | A | * | 8/1998 | Nido ............................ 257/18 |
| 5,894,125 | A | * | 4/1999 | Brener et al. ............... 250/330 |
| 6,028,692 | A | * | 2/2000 | Rhoads et al. ............... 359/245 |
| 6,476,411 | B1 | * | 11/2002 | Ohno et al. ..................... 257/15 |
| 6,909,104 | B1 | * | 6/2005 | Koops et al. ............. 250/493.1 |
| 2005/0029508 | A1 | * | 2/2005 | Laikhtman et al. ............ 257/14 |
| 2005/0058166 | A1 | * | 3/2005 | Hu et al. ........................ 372/43 |
| 2005/0058168 | A1 | * | 3/2005 | Hu et al. ........................ 372/44 |

* cited by examiner

*Primary Examiner*—Nikita Wells
*Assistant Examiner*—Johnnie L Smith, II
(74) *Attorney, Agent, or Firm*—Edell, Shapiro & Finnan, LLC

(57) ABSTRACT

A device for generating terahertz radiation. The device comprising a dipole generating layer, a coupling block and an extraction block. The coupling block is transparent to laser light and is in contact with the surface of the dipole generating layer to couple light from a laser to the surface of the dipole generating layer, when the device is in use. The extraction block is located in contact with the surface of the dipole generating layer to provide an emission extraction surface. The refractive indices of the dipole forming layer, the coupling block and the extraction block are substantially equal. In this way, the dipole which is generated upon illumination of the dipole generating layer by a laser, has an axis which is not perpendicular to the emission.

16 Claims, 4 Drawing Sheets

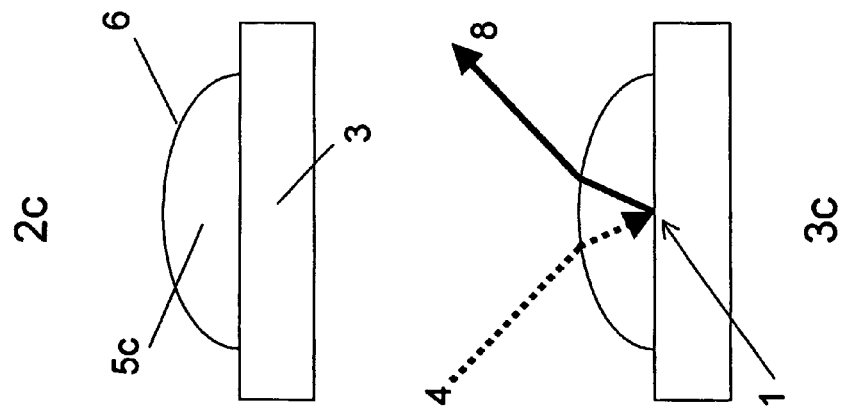
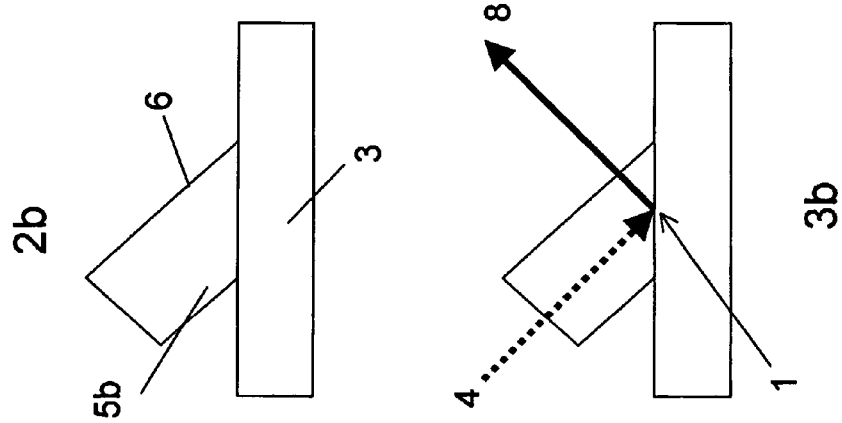
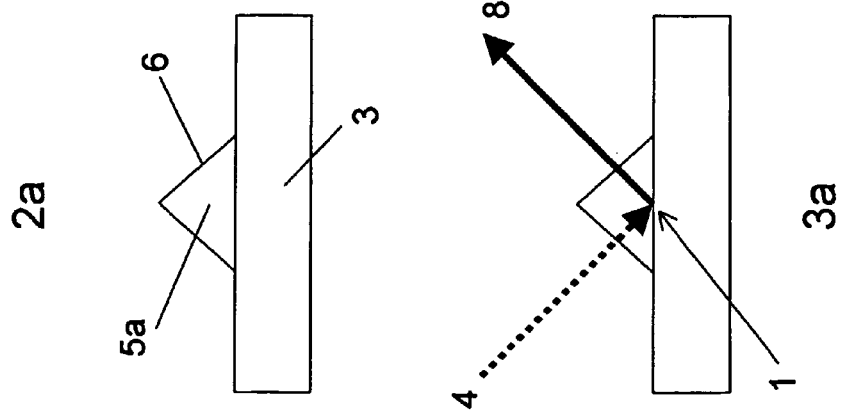
Figure 2
Figure 3

DEVICE FOR GENERATING THZ RADIATION

CROSS REFERENCE TO RELATED APPLICATIONS

This application claims priority under 35 U.S.C. §119(e) to UK Application No. 0119564.3, filed Aug. 10, 2001, the entire contents of which are incoporeated herein by reference.

This invention relates to the generation and extraction of terahertz (THz) radiation in semiconductors.

Emerging applications of coherent THz radiation spectroscopy and imaging are currently limited by the lack of compact, high power THz emitters.

Surface field THz generation occurs when a semiconductor is illuminated by a sub-picosecond laser pulse with photon energy greater than the semiconductor bandgap. The electric field within the surface depletion region accelerates electrons and holes in opposite directions. The resulting charge separation, which occurs on a picosecond time scale, forms a dipole that emits a coherent THz transient.

THz generation occurs in p-i-n diodes when the device is illuminated with sub-picosecond laser pulses, when the photon energy is greater than the bandgap energy of the semiconductor making up the i (intrinsic) region. The electric field within the i region of the p-i-n accelerates the photogenerated charges. This electric field can be increased or decreased by applying a voltage between the n-region and the p-region. By adjusting the voltage the maximum output frequency of the THz radiation can be tuned.

The spot size, to which the excitation laser is focussed, determines the lateral extent of the THz dipole. If this spot size is small (<100 microns), diffraction effects are important, and the THz radiation is emitted over a broad range of angles. To produce a directed THz beam it is necessary to use a collimated laser beam with beam-waist larger than the THz wavelength (typically approximately 250 microns). The dipole then emits strongly only in the direction of the reflected and/or transmitted laser beam.

It is well known that an enhancement in surface field THz emission can be achieved from a variety of semiconducting materials when a large magnetic field is applied to it. The main effect of the Lorentz force is to re-orientate the THz dipole with respect to the surface of the semiconductor, with little change to the dipole strength. This new dipole orientation allows a greater transmission of the THz radiation through the surface of the semiconductor which results in an increase in emitted THz power.

Provision of high power, large magnetic fields can be complex and expensive. It would, therefore, be beneficial to achieve the induced enhancement in surface field THz emission without the requirement of the large magnetic field.

As an alternative, or in addition to the use of a large magnetic field, THz emitters electrodes may be placed adjacent to the surface of the THz emitting semiconductor in order to create an electric field across the surface. This technique allows a certain amount of controllability to be achieved. However, it is limited by the break-down voltage and in terms of the frequency that can be generated (<1.5 THz) as higher voltages will break down the field and the metal electrodes will melt across the gap.

According to the present invention there is provided a device for generating terahertz radiation comprising:

a dipole generating layer;

a coupling block, transparent to laser light, in contact with the surface of the dipole generating layer to couple light from a laser, in use, to the surface of the dipole generating layer, in use; and an extraction block, in contact with the surface of the dipole generating layer to provide an emission extraction surface, wherein the refractive indices of the dipole forming layer, the coupling block and the extraction block are substantially equal, such that the dipole generated, in use, upon illumination of the dipole generating layer by a laser, has an axis which is not perpendicular to the emission extraction surface.

The segment of the emission pattern that is extracted is not aligned with the dipole axis, therefore, as the deviation of the dipole axis from the perpendicular increases, the emission strength is enhanced.

The extraction block and the coupling block may be one of the group of a prism or a lens.

Suitable materials for the dipole forming layer include InAs and GaAs. Whereas suitable materials for the extraction block and coupling block include InAs, GaAs, GaP and InP.

Where the incident laser is to be reflected at the surface of the dipole generating layer, the coupling block and the extraction block may be provided as a single component. Where the incident laser is to be transmitted through the dipole generating layer, the dipole generating layer and the extraction block may be provided as a single component.

The dipole-forming layer may comprise at least one semi-conducting layer. The dipole-forming layer may be a p-i-n diode.

The refractive index of the dipole forming layer may be effectively reduced by forming holes in the emission surface, this enables a greater segment of the dipole emission pattern to be extracted. The surface of dipole-forming layer may be patterned.

The surfaces of the coupling block and/or the extraction block may be coated with an anti-reflective material.

A system may be provided which comprises the aforementioned device for generating terahertz radiation, a laser generator which, in use, generates sub-picosecond laser pulses and control circuitry.

Examples of the present invention will now be described with respect to the accompanying drawings, in which:

FIG. 2A illustrates a physical construction according to the present invention where a prism provides the coupling and extraction block and is used in combination with a terahertz emitting semiconductor device;

FIG. 2B illustrates an alternative device according to the present invention utilising a wedge in combination with the terahertz emitting semiconductor device; and FIG. 2C illustrates an alternative device according to the present invention utilising a lens in combination with the terahertz emitting semiconductor device;

Figure 4:
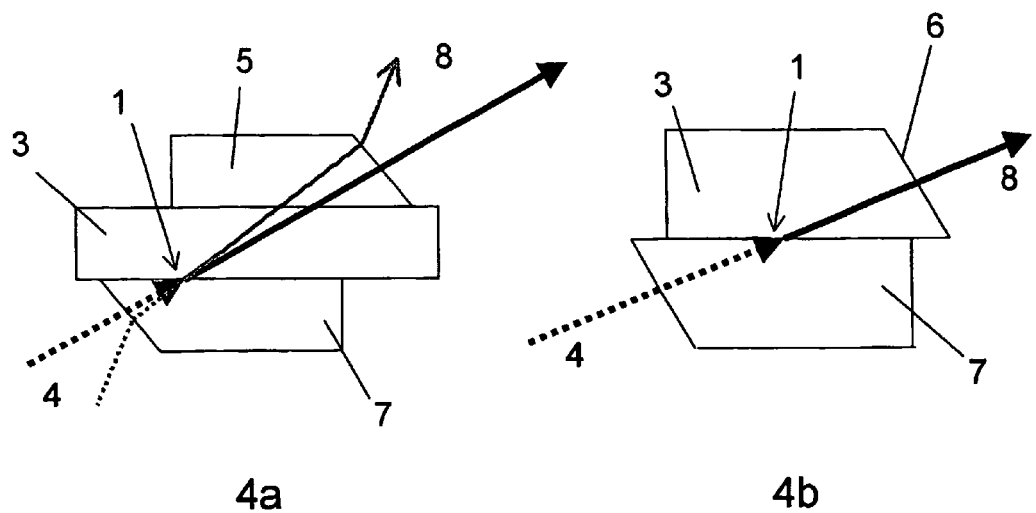
Figure 5:
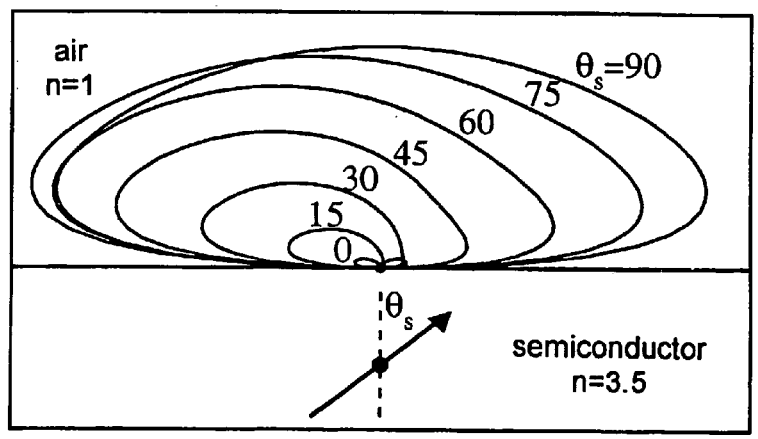

FIGS. 3A, B and C illustrate the device of FIGS. 2A, B and C, in use;

FIG. 4a illustrates a device according to the present invention, in use where the terahertz radiation is extracted, through the dipole generating layer, in the direction of the incident laser light;

FIG. 4b illustrates an alternative device of the present invention where the extraction block and the dipole generating layer are provided by a single component; and FIG. 5 illustrates the calculated emitted THz power as a function of the dipole angle.

Figure 6:
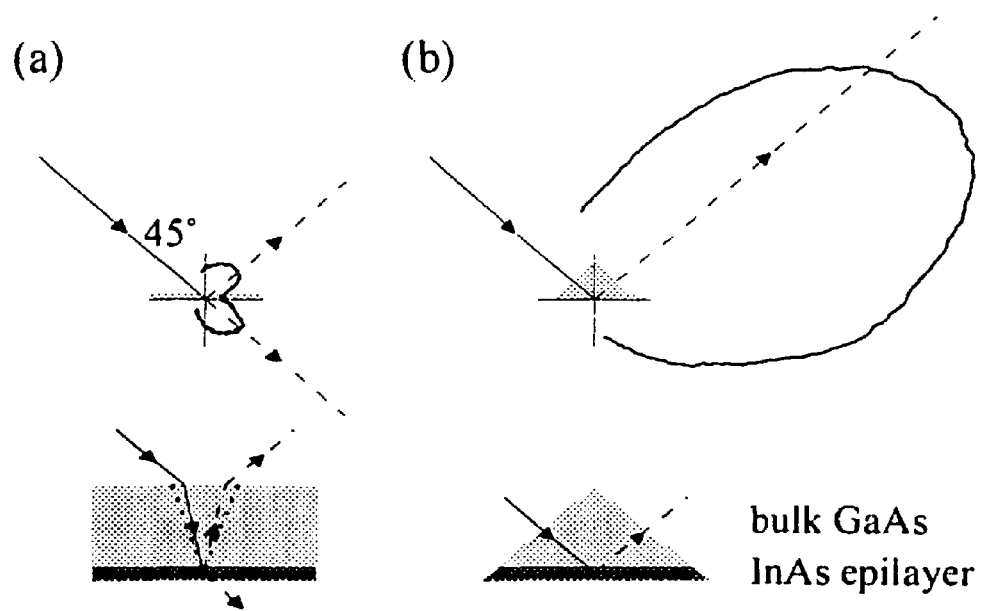

FIG. 6a shows the radiation pattern of THz radiation from a planar reference sample.

FIG. 6b shows the radiation pattern of THz radiation from a prism sample.

Figure 7:
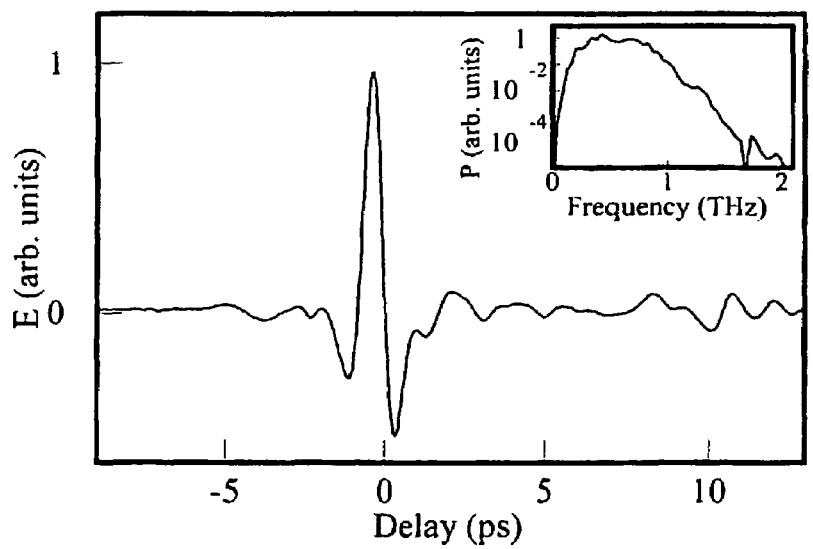

FIG. 7 shows the electric field of the THz transient produced by a prism emitter and the power spectrum of the emitted pulse.

Figure 1:
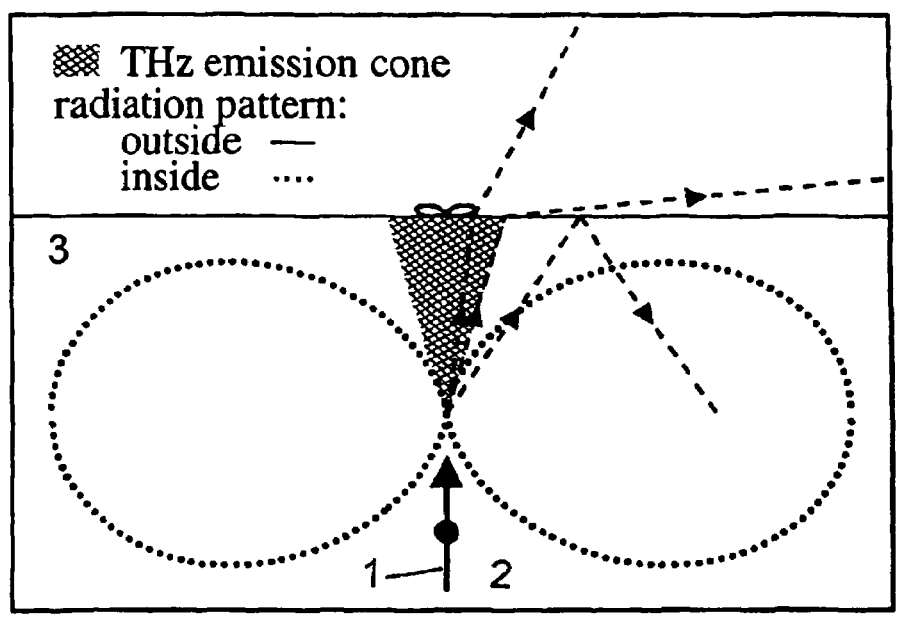
FIG. 1 is an example THz emission pattern from a dipole within a semiconductor device.

As discussed above, illumination of the surface of the semiconductor device 3 by sub-picosecond laser pulses 4 with photon energy greater than the semiconductor bandgap results in formation of a dipole 1. This dipole 1 emits a coherent THz transient with a power distribution that is illustrated in FIG. 1. The axis 2 of the dipole 1 is perpendicular to the surface of the semiconductor 3. The region of the emission pattern which may be extracted through this surface is limited by the refractive properties of the semiconductor material. In a material with a refractive index, n≈3.5 all radiation at an internal incidence angle of greater than approximately 17° to the normal of the surface, will be reflected back within the material. The region defined by this angle is referred to as the emission cone. Since the emission pattern of dipole 1 is biassed away from the axis of the dipole 2, it follows that the restriction to, say, ±17° would prove to be limiting. It has been shown that only 0.1% of the emitted power will escape under such circumstances.

By introducing a block of additional material 5 of the same refractive index the orientation of the dipole 1 will be unaffected. The surface 6 of this block 5 can be formed in a non-parallel plane to that of the dipole forming layer 3 such that an alternative section of the THz emission pattern is presented to the external surface 6. There will still be a limitation of ±17° to the normal of this alternative surface 6 but this will correspond to a larger angle relative to the dipole axis 2, where the emission is stronger. Consequently, an enhancement of the level/efficiency of THz extraction can be found without the need for a high power, large magnetic field.

The spot size, to which the excitation laser 4 is focussed, determines the lateral extent of the THz dipole 1. If this spot size is small (<100 microns), diffraction effects are important, and the THz radiation is emitted over a broad range of angles as shown in FIG. 5. In such a case a diffraction grating may be introduced onto the surface of the dipole forming layer 3 to allow for an increased level of extraction of the radiation through the surface.

It is preferable to produce a directed THz beam, as such it is necessary to use a spot size larger than the THz wavelength (typically approximately 250 microns). For a larger spot, the in-plane coherence across the emitting region tends to collimate the emitted THz radiation in the same direction as the reflected laser light. Thus, by increasing the spot size, a greater friction of the THz power can be extracted. The excited spot can be considered as a distribution of point dipoles, with relative phases set by the phase variation across the laser pulse, causing collimation in the reflection direction. Therefore, as the angle of incidence (and hence emission) is varied, the power obtained in the collimated direction follows closely the emission pattern for the point dipole, as has been previously demonstrated experimentally. This means that, even with a large laser spot, it remains highly beneficial to re-orient the dipole relative to the surface. By using a coupling block 7 in the form of a prism 5a, wedge 5b or lens 5c one must also allow the collimated laser to excite the dipole forming layer 3 at an angle such that the direction of the emitted THz beam is in an efficient radiating direction for the dipole 1 and able to be coupled out of the dipole forming layer—extraction block combination. This can be achieved by passing the exciting laser 4 through another surface of the extraction block 5.

The terahertz generator of FIG. 2A is provided in combination with a 45° prism 5a. The materials used for the different components are of substantially similar refractive indices. In this case the terahertz generator 3 is made from InAs (n=3.5) and the prism 5a is made from GaAs (n=3.5). The material of the prism 5a must be transparent to the incident laser light 4.

The prism 5a provides a means for coupling an incident laser 4 to the surface of the terahertz generator 3 in addition to a secondary extraction surface 6 for the dipole emission pattern as discussed above. In other words an extraction block 5 is provided such that the extraction surface 6 of the device is altered to be at 45° to the original semiconductor 3 surface.

The device of FIG. 2B is similar to that of 2A but that the extraction block 5 is a wedge 5b.

In FIG. 2C the extraction block 5 is provided by a lens 5c, which allows access to an increased level of internal angles. FIGS. 3A, B and C illustrate these devices in use.

FIG. 4A shows a three component device of the present invention for use where the terahertz radiation 8 is to be transmitted through the dipole generation layer 3. A coupling block 7 is provided between the THz generator 3 and the incident laser 4, in use. The dipole 1 is formed in the dipole forming layer 3 at the point where the laser 4 first comes into contact with it (illustrated in FIG. 4A). The terahertz radiation is extracted from the dipole forming layer via an extraction block. Since this dipole generation location is not adjacent to the emission surface it is possible to reshape the dipole forming layer 3 (as shown in FIG. 4B) to allow it to act as an extraction block directly. In other words an alternative surface 6 can be formed within the THz generator 3 such that the stronger section of the THz emission pattern can be accessed and extracted.

The device when using a p-i-n diode is tunable, in use, by adjusting the voltage across the diode. Higher voltage leads to larger charge carrier acceleration and hence a larger maximum THz frequency (up to 40 THz). Surface field emitters would be tailored during manufacture to a particular frequency, by altering the doping concentrations during semiconductor growth, which controls the electric field profile.

An alternative way to match the refractive indicies is to reduce the index of the emission layer 3. By forming holes in the emission surface of the dipole layer, the effective refractive index is reduced, allowing matching to an extraction block 5 with lower refractive index. This requires the holes, and their separation, to be much smaller than the THz wavelength (perhaps 10 microns). Reducing the refractive index increases the range of internal angles which may be extracted, so this will also increase the output power in the absence of the extraction block 5 (prism or lens).

In an alternative specific example of the present invention the prism is fabricated using molecular beam epitaxy to deposit a 500 nm thick layer of crystalline InAs onto a 500 μm semi-insulating (100) GaAs wafer. The InAs layer is found to be n-type doped with a carrier density of $5 \times 10^{16}$ cm$^{-3}$ at room temperature. The wafer is cleaved into 1.5 mm strips which are glued, epilayer down, onto a brass polishing block. Two facets of the prism are then polished with diamond pastes to form a right-angle prism. Finally, measurements are performed at room temperature, with the device suspended in air, and one of the unpolished strips is used as a (planar) control sample.

Pulses from a Ti:sapphire laser (wavelength=920 nm, TM polarised, pulse length=140 fs, pulse energy=2.5 nJ, pulse repetition rate 86 MHz) are incident at 45° on the back surface of the control and focussed to form a Gaussian intensity profile ($\sigma$=45 µm). The laser pulses have a photon energy below the bandgap of GaAs, but above that of InAs, so the pulses pass through the GaAs before being absorbed in the InAs. The THz transient is thus generated in the InAs, but, because the index mismatch is small, there is negligible refraction when it passes into the GaAs.

The angular power distribution of THz radiation emitted from the control sample is obtained by measuring the voltage of an apertured Golay-cell bolometer (Cathodeon, Cambridge UK), which is rotated around the sample. The resulting radiation pattern is shown in FIG. 6a. The two lobes on the polar plot show the weakly collimated THz beam propagating in the direction of the reflected (45°) and transmitted (135°) laser beam. Similar radiation patterns have previously been reported for bulk surface-field emitters. The measured power is identical to that obtained from the surface of an InAs bulk wafer under the same excitation conditions.

The prism sample is excited under the same conditions as the planar control, with the laser at normal incidence to one of the polished facets, giving an internal angle at the InAs interface of 45°. The THz emission is then collimated around a direction 45° to the dipole axis, and emerges normal to the other prism facet. The measured radiation pattern is shown in FIG. 6b. The peak THz angular intensity is 8.7 times greater than for the planar reference sample. Furthermore using f/3 collection optics to collect THz radiation emitted within a cone of 9.5°, the total power ($\approx$7 µW) is found to be 21 times greater for the prism. Indeed, the angularly broad emission from the prism results in considerably larger enhancement factors when using even smaller f-number optics.

FIG. 7 shows the electric field of the THz transient produced by the prism emitter. The shape of the THz pulse emitted from the prism is similar to the weaker measurements obtained from the reference sample and from a bulk InAs wafer under the same conditions. These results demonstrate the coherent nature of the generated radiation, and show that the prism does not modify the desirable half cycle waveform of the THz pulse. The inset of FIG. 7 shows the power spectrum of the emitted pulse.

Other approaches have been used to produce high power pulses. For example, it has been known for several years that the power generated at semiconductor surfaces can be enhanced by approximately an order of magnitude by the application of a large (3–8 Tesla) magnetic field. This effect has been explained theoretically as a consequence of the rotation of the THz dipole, resulting from the Lorentz force acting on the moving carriers. Our ability to produce a similar power enhancement using the prism geometry provides an experimental confirmation of this explanation. In contrast to the prism device, magnetic-field-enhanced emitters have the disadvantage that they require large magnets to produce the high magnetic fields, which limits their use in many applications.

What is claimed is:

1. A device for generating terahertz radiation comprising:
a dipole generating layer;
a coupling block, transparent to laser light, in contact with the surface of the dipole generating layer to couple light from a laser, in use, to the surface of the dipole generating layer, in use; and
an extraction block, in contact with the surface of the dipole generating layer to provide an emission extraction surface, wherein the refractive indices of the dipole forming layer, the coupling block and the extraction block are substantially equal, such that the dipole generated, in use, upon illumination of the dipole generating layer by a laser, has an axis which is not perpendicular to the emission extraction surface.

2. A device according to claim 1, wherein the extraction block is one of the group of a prism and a lens.

3. A device according to claim 1, wherein the coupling block is one of the group of a prism and a lens.

4. A device according to claim 1, wherein the dipole forming layer is made from a material from the group of InAs and GaAs.

5. A device according to claim 1, wherein the extraction block and coupling block are made from a material from the group of InAs, GaAs, GaP and InP.

6. A device according to claim 1, wherein the incident laser is reflected at the surface of the dipole generating layer.

7. A device according to claim 6, wherein the coupling block and the extraction block are provided as a single component.

8. A device according to claim 1, wherein the incident laser is transmitted through the dipole generating layer.

9. A device according to claim 8, wherein the dipole generating layer and the extraction block are provided as a single component.

10. A device according to claim 1, wherein the dipole-forming layer comprises at least one semi-conducting layer.

11. A device according to claim 10, wherein the dipole-forming layer is a p-i-n diode.

12. A device according to claim 1, wherein the refractive index of the dipole forming layer is effectively reduced by forming holes in the emission surface.

13. A device according to claim 1, wherein the surface of dipole-forming layer is patterned.

14. A device according to claim 1, wherein the surfaces of the coupling block are coated with an anti-reflective material.

15. A device according to claim 1, wherein the surfaces of the extraction block are coated with an anti-reflective material.

16. A system comprising:
a device for generating terahertz radiation according to claim 1;
a laser generator which, in use, generates sub-picosecond laser pulses; and control circuitry.

* * * * *